T. O. BUSSLER.
AUTOMOBILE RADIATOR CAP.
APPLICATION FILED APR. 24, 1920. RENEWED DEC. 16, 1920.
1,385,304. Patented July 19, 1921.
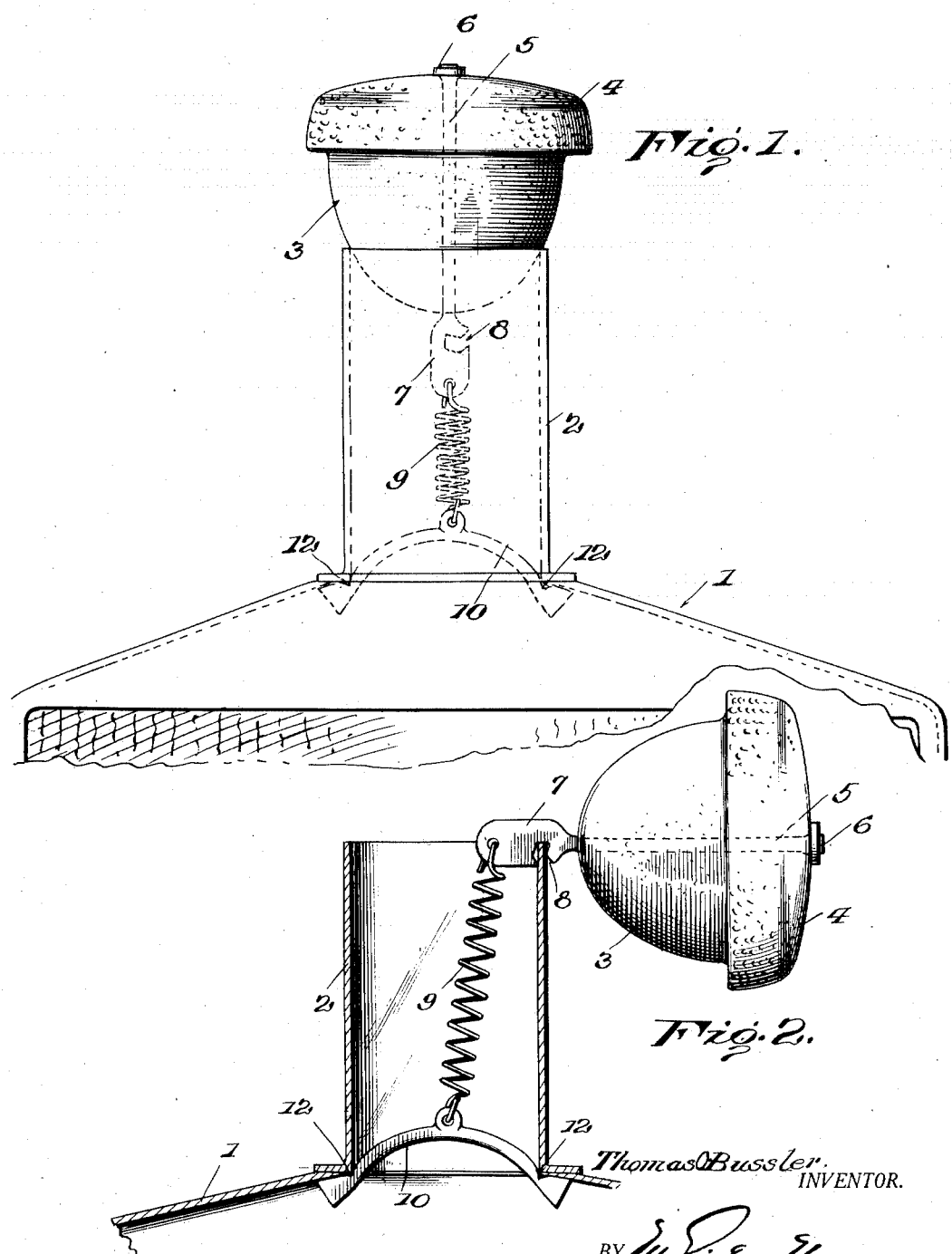

UNITED STATES PATENT OFFICE.

THOMAS O. BUSSLER, OF WHEELERSBURG, OHIO, ASSIGNOR OF ONE-HALF TO CECIL NOLCHE, OF PORTSMOUTH, OHIO.

AUTOMOBILE-RADIATOR CAP.

1,385,304. Specification of Letters Patent. Patented July 19, 1921.

Application filed April 24, 1920, Serial No. 376,317. Renewed December 16, 1920. Serial No. 431,274.

*To all whom it may concern:*

Be it known that I, THOMAS O. BUSSLER, of Wheelersburg, in the county of Scioto and State of Ohio, have invented certain new and useful Improvements in Automobile-Radiator Caps; and I do hereby declare the following to be a full, clear, and exact description of the invention, such as will enable others skilled in the art to which it appertains to make and use the same.

My invention contemplates an improved cap for the filler neck of an automobile radiator. It has heretofore been customary to thread these caps onto the necks. Frequently it is difficult to remove them and requires the application of a wrench. Also when steam is generated in the radiator and can find no means of exhaust considerable damage may be done. I provide a cap normally held seated by a spring but capable of yielding under steam pressure and one which may be readily unseated by hand to permit of filling the radiator.

In the drawing, Figure 1 shows the cap in normal closed position and Fig. 2 shows it opened by hand to permit of filling.

I have indicated the top wall 1 of an ordinary automobile radiator having the usual filler neck 2 which is usually of cylindrical formation. The cap is of substantially acorn formation, having a spherical body portion 3 adapted to be seated within the upper end of the filler neck and a flattened top portion 4 extending slightly beyond the spherical body to provide a ready handhold.

A bar 5 is shown rigidly fixed in the cap and extending vertically through its center, being held at the top by a nut or rivet 6. This bar extends through the bottom of the cap and is formed at its inner end with a flat plate 7 formed with a notch 8 in one of its side edges. The walls defining this notch are so shaped as to insure the plate firmly gripping the wall of the filler neck when the cap is turned into the position shown in Fig. 2.

A coiled spring 9 is shown connected to the lower end of the plate 7, its extremity passing through a hole in the plate to provide a swiveled union. This spring connects the plate 7 with an arm 10 which is shown of arched formation and formed with notches 12 near its extremity. This arm is adapted to be placed across the lower end of the filler neck.

In practice the parts are normally in the position indicated in Fig. 1, spring 9 and arm 10 holding the acorn cap firmly to its seat. The tension of the spring necessary to maintain this position, however, need not be so great as to resist the pressure of steam that may be generated in the radiator. Consequently the steam pressure may unseat the cap sufficiently to allow the pressure to be relieved. Owing to the substantially spherical formation of the part 3 of the cap and the direct downward pull of the spring the cap will readily and properly seat itself as soon as the steam pressure is sufficiently exhausted.

When the user wants to fill the radiator with water he grasps the top 4 of the cap and turns it into the position of Fig. 2, the wall of the filler neck entering the notch 8 of the plate 7 and holding the cap away from the filler neck. When the radiator is filled it is only necessary to lift the cap and the tension of the spring will immediately bring it to its proper seated position.

I claim as my invention:

1. In combination with an automobile radiator formed with a cylindrical filler neck extending outward therefrom, of a cap for said neck having a substantially spherical body portion, a plate projecting from the inner face of said cap and formed with a notch in its edge, an arm extending across the base of said neck and held by the radiator wall surrounding the neck, and a spring within said neck connecting said plate with said arm.

2. In combination with an automobile radiator formed with a cylindrical filler neck extending outward therefrom, of a cap for said neck having a substantially spherical body portion, a plate projecting from the inner face of said cap and formed with a notch in its edge, an arched arm extending across the base of said neck and formed with notches near its extremities to engage the radiator wall surrounding the neck, and a spring within said neck connecting said plate with said arm.

In testimony whereof I have signed this specification.

THOMAS O. BUSSLER.